United States Patent [19]

Walker

[11] 4,169,285
[45] Sep. 25, 1979

[54] METHOD FOR PRODUCING COLOR REPRESENTATIONS OF QUANTIFIABLE DATA BY MAXIMIZING DIFFERENTIAL PERCEPTION OF COLORS

[75] Inventor: Lloyd R. Walker, Houston, Tex.

[73] Assignee: Sefel J. & Associates Inc., Houston, Tex.

[21] Appl. No.: 858,524

[22] Filed: Dec. 7, 1977

[51] Int. Cl.² .............................................. G06F 15/20
[52] U.S. Cl. ...................................... 364/518; 346/46; 346/157; 364/525
[58] Field of Search ....................... 364/515, 518, 525; 346/46, 157; 343/5 CD; 340/15.5 DS

[56] References Cited

U.S. PATENT DOCUMENTS

3,961,306  6/1976  Anstey .......................... 340/15.5 DS

Primary Examiner—Jerry Smith

[57] ABSTRACT

A method is described wherein quantifiable data which have arbitrary dynamic ranges and which vary as a function of other parameters are represented in color. A set of subranges, without restriction in number, representing data properties are associated with a color set in such a way that the colors are perceived to be maximally differentiable by interpreters, whether human, electronic, or other, by specifically incorporating information concerning the normal or anomalous characteristics of the interpreter's color perception when determining the color set. The method further provides for the realization of color displays by directly associating the colors with densities, transmittances, or illumination levels for negatives, positives, or colored light emitting devices, whether the realization requires primary additive or primary subtractive hues.

11 Claims, 14 Drawing Figures

METHOD FOR PRODUCING COLOR REPRESENTATIONS OF QUANTIFIABLE DATA BY MAXIMIZING DIFFERENTIAL PERCEPTION OF COLORS

BACKGROUND OF THE INVENTION

1. Field of the Invention

The present invention relates generally to the color display of time series or space series information which may be discretely sampled or continuous in nature, in one or more dimensions, or in combination. More particularly, the present invention relates to a method of producing color displays of information wherein maximum differential perception by the interpreter of the display is assured.

2. Description of the Prior Art

Patents have been granted to methods which convert time or space series information whether called signals, waveforms, functions, graphs, or pictures into color outputs, the colors of which were assigned on the basis of some property of the series in question. One such patent, U.S. Pat. No. 3,961,306, teaches a method wherein the information is scaled into incremental ranges and each range is assigned a color corresponding to a sample value. The colors are assigned from a table that is constructed beforehand and which contains information relating to the densities of the various component displays required to make the assigned colors. The table is constructed by arbitrarily picking colors.

A shortcoming of the prior art is that the colors must be chosen beforehand, analyzed, and component densities chosen in order to create an assignment table. This task becomes arduous for a large number of ranges.

Another shortcoming of the prior art is that there is no teaching in any of the prior art patents of a method that assures maximal differential perception of the colors assigned to the output. For example, the usual system for assigning colors is spectrally; where, for example, large sample values are assigned colors near the violet end and small sample values are assigned colors near the red end, with intermediate values assigned in between. When a large number of sample values are displayed, the differences between colors assigned to closely spaced values become quite subtle and difficult, if not impossible, to discriminate.

A further shortcoming of the prior art is that there is no teaching of a method that takes into account color visual deficiencies among observers. There are color visual anomalies wherein the ability of an individual to perceive certain hues is either diminished or nonexistent. In methods based on arbitrary assignments of colors, certain hues that are clearly distinquished by normally sighted individuals are completely indistinquishable to those with a color vision deficiency. Such indistinquishability introduces ambiguity into the color display.

SUMMARY OF THE INVENTION

It is therefore an object of the present invention to provide a method for making color displays that assures maximal differential perception of the colors assigned to the output. It is a further object of the present invention to provide a method that provides for maximal differential perception in the case of human visual or electromechanical sensitometric irregularities or deficiencies. It is a still further object of the present invention to provide a method for flexibly and directly determining the maximally different colors in terms of primary additive or primary subtractive hues without the need of first preassigning values of density, transmittance, or illumination level to numeric codes through the use of tables or matrices.

Briefly stated, the foregoing and other objectives are accomplished in the present invention by assigning each measure of the information to be displayed to a point in a color space such that the distribution density of such points is substantially equal in certain specified ways. A color display dynamic range is defined, which comprises an arbitrary number of subranges wherein each subrange is associated with a distinct color. Each measure of the information to be displayed is associated with a subrange and, by means of a color contrast parameter, each subrange is associated with a point in a color space such that the distribution density of such points is substantially equal.

The present invention further provides a method whereby the spherical coordinates of each point in the color space may be transformed into Cartesian coordinates, which may be directly converted into densities, transmittances or illumination levels, of primary hues necessary to produce the display. The present invention also provides a method by which color visual deficiencies of the interpreter may be compensated for.

DESCRIPTION OF THE PREFERRED EMBODIMENT

A measurement of a physical quantity, here defined to include a purely mathematical quantity or number and hereafter called the dependent quantity, whether it be a number, a length, a mass, a time, an electric current, a temperature, a unit of luminous intensity, a plane angle, a solid angle, or a quantity derived from any combination of the above or equivalent to the same or any combination of the same (e.g. a voltage, or potential or electromotive force, is equivalent to a number of volts whether specified in units of abvolts or statvolts, etc. and a volt is the combination kilogram multiplied by meter squared divided by seconds cubed divided by amperes, where a kilogram is a mass, a meter is a length, a second is a time, and an ampere is an electric current), which is itself a function of a physical quantity of quantities as defined, hereinafter called the independent quantity of quantities, is to be converted into a color representation of a measure of the quantity where the measure is expressible as any numeric result after the application of any mathematical operation or sequence of operations to the measurement, e.g. multiplying the measurement by one, or taking 20 times the logarithm to the base ten of the measurement. The total of all such measurements, whether they be continuous or discretely sampled will, for practical purposes, have a finite, domain of independent quantity or quantities. Within this domain, the maximum and minimum values of the measure of the dependent quantity define the dynamic range of the measure. This dynamic range may be divided into an arbitrary unlimited number of equal or unequal subranges thereby fixing the extent of each subrange, or the extent of each subrange may be arbitrarily fixed thereby fixing the number of subranges. The dynamic range displayed in color need not be exactly the same at the total dynamic range of the measure, but may exceed, equal, or be less than the latter quantity. Thus a specification of subrange size and number can and will determine the color display dynamic range without regard to the dynamic range of the measure.

The method concerns the assignment of maximally differentiable colors to the subranges of the color display. Measurement data for the dependent quantity are converted to the measure of the quantity for each of those independent quantities or sets of independent quantities falling within the finite range extent of the color display to be produced. Each measure so found will lie within a subrange, known as an interior subrange, as defined, if the color display dynamic range is set to be equal to or greater than on either or both top and bottom of the dynamic range of the measure; if the color display dynamic range is set to be less than, on either or both top and bottom of, the dynamic range of the measure, then some measures of the quantity will fall outside the available subranges. In this last case such measures may be assigned to the closest subrange, in which case such subrange will be known as an exterior subrange. The method imposes no impediment upon the number of subranges which may be utilized and their number may exceed the storage capacity of any computer or tabular array.

For each subrange so defined, a unique and differentiable color is assigned according to the following method.

Figure 1:
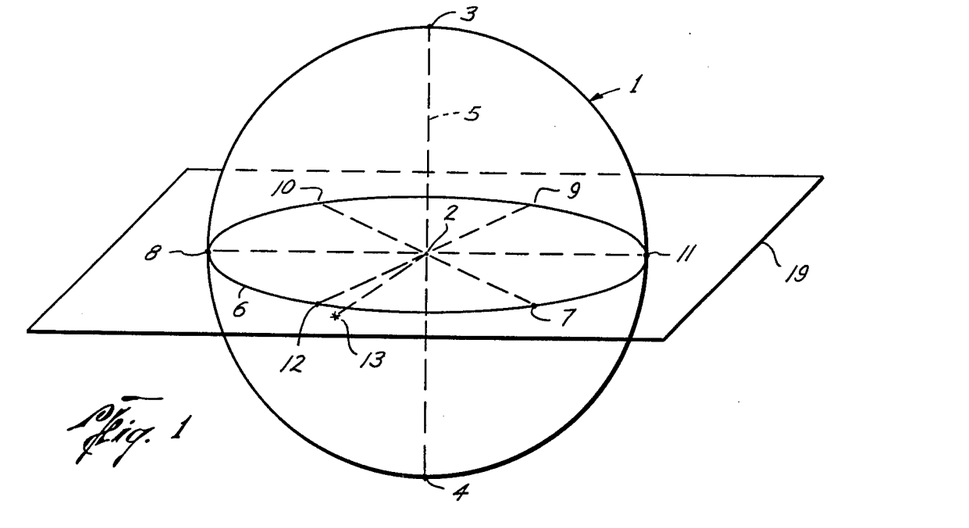
FIG. 1 is a schematic display of the basic construction of a color sphere used to define colors.

In order to describe color adequately, construct a color space, which in the preferred embodiment is sphere 1 of FIG. 1, wherein the central point 2 of sphere 1 represents neutral gray, equidistant from opposite poles representing pure white 3 and pure black 4. The axis of sphere 1 joining poles 3 and 4 and passing through neutral gray point 2 is the gray axis 5. The equatorial great circle 6 is formed by the intersection of the outer surface of sphere 1 with the plane 19 normal to gray axis 5 and passing through gray point 2. The three primary additive hues, red 7, green 8, and blue 9, are located on and divide equatorial circle 6 into equal segments defining directions in the equatorial plane 19 which are 120° apart. The three primary subtractive hues, which are complementary to the above additive hues, are respectively, cyan 10, magenta 11, and yellow 12, and lie diametrically opposite to their complements on the equatorial circle 6. Thus any arbitrary visible color 13 can be represented as a position within or on the sphere and this position can be described conveniently by spherical polar coordinates r, $\theta$ and $\phi$.

The equivalent saturation of the color, or purity, or relative departure from neutral gray, is measured by the radial distance, r, from center 2 of sphere 1. All points along the line segment from central point 2 to arbitrary color 13 or its extension to the spherical surface if arbitrary color 13 does not lie on the surface of sphere 1, continuously represent varying proportions of neutral gray from totally neutral gray at center 2 of sphere 1 to complete absence of neutral gray at the surface of sphere 1.

Figure 2:
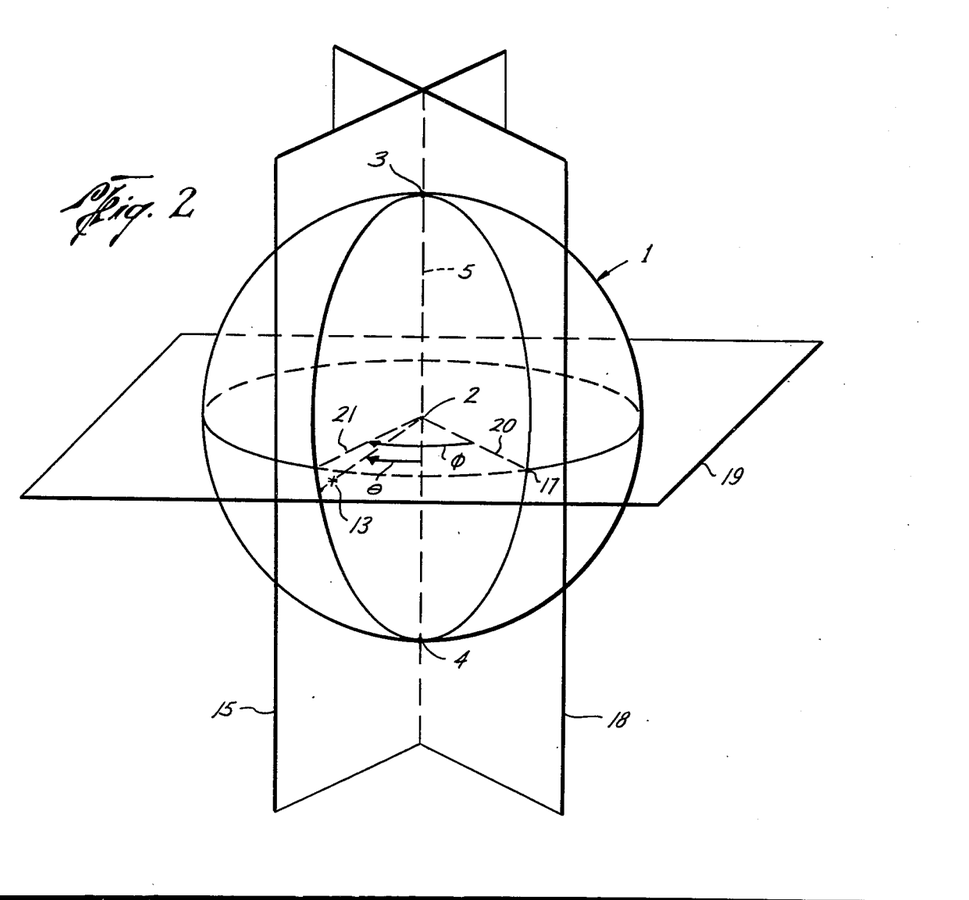
FIG. 2 is a schematic display showing the construction of a coordinate system which locates colors determined in the method.

FIG. 2 depicts the determination of the remaining coordinates $\theta$ and $\phi$. The plane 15 passing through and defined by point 13 and gray axis 5 contains the line segment passing from central point 2 to color 13. This line segment makes an angle, $\theta$, with respect to gray axis 5 measured from the direction of a reference pole, which for purposes of example is taken to be black pole 4, and this latitudenal angle is a continuous measure of the equivalent color value, or brightness, or proximity to whiteness, of color 13.

Finally, a reference hue 17 is chosen which, depending upon whether an additive or subtractive realization of the method is desired, will correspond to either one of the additive primary hues or one of the subtractive primary hues. The reference hue plane 18 is the plane passing through and defined by reference hue 17 and gray axis 5, and plane 18 intersects equatorial plane 19 along the line 20. In a similar way, plane of equivalent hue 15, passing through color 13, intersects equatorial plane 19 along the line 21. The angle $\phi$ in equatorial plane 19, measured from reference line 20, is a continuous measure of the equivalent hue, or distinctive essence, or generic classification, of color 13.

The method seeks to maximize the differential perception of colors assigned to the subranges of the color display. Consider the case in which all of the colors of color sphere 1 are unambiguously and distinctly perceivable by either human, electromechanical, or other mensurative means. Let the radius of the color sphere be $r_s$ as in FIG. 3. Then maximally differentiable colors lie on the surface of the sphere 1, since these are farthest removed from gray axis 5. All colors for subranges will therefore be specified by $r=r_s$.

Figures 3, 4, 5:
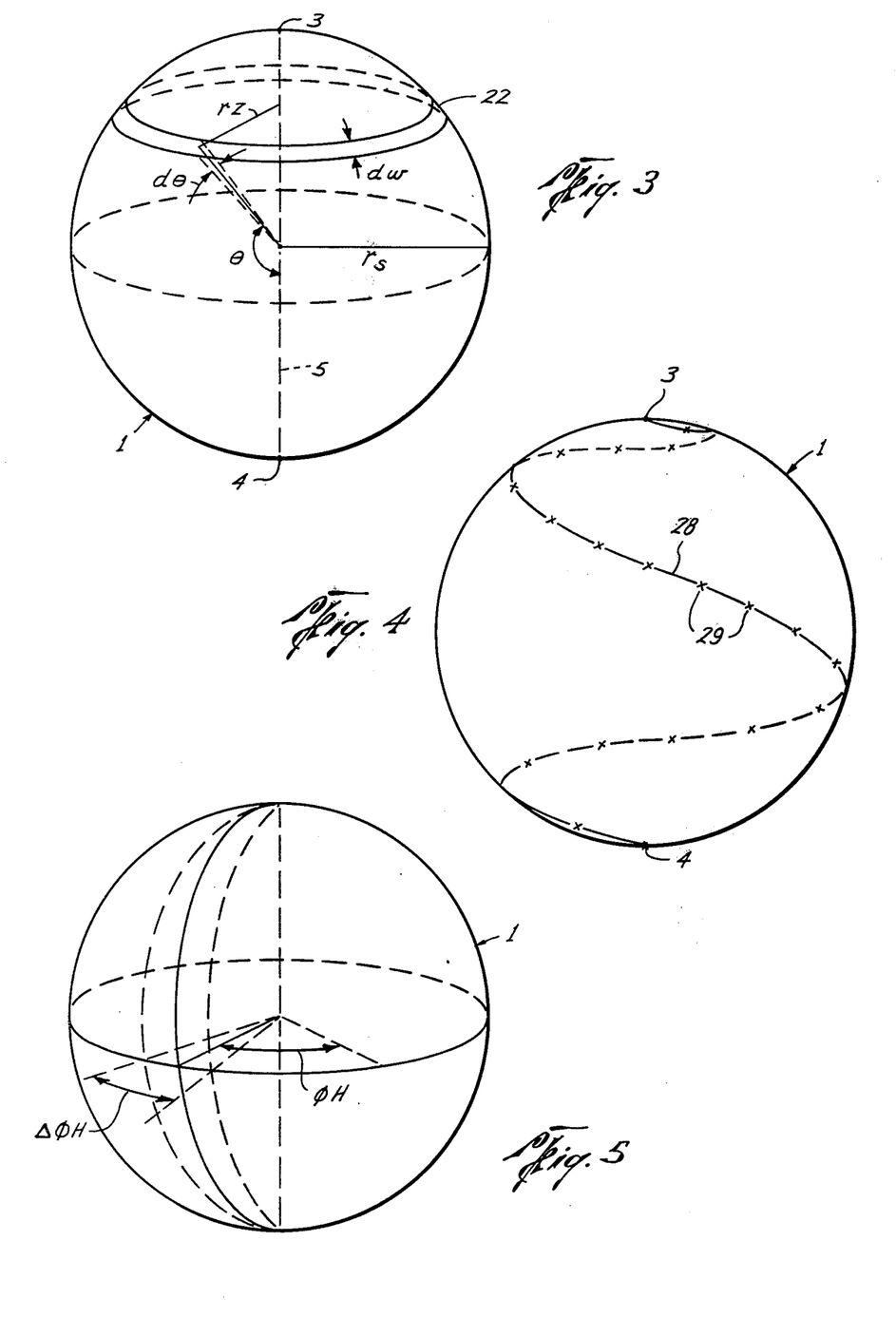
FIG. 3 is a schematic drawing that shows the construction of an element of zonal area on the color sphere surface which is used to determine the distribution of maximally differentiable colors.
FIG. 4 is a schematic drawing illustrating a spiral path on the color sphere surface along which maximally differentiable colors are located.
FIG. 5 is a schematic drawing that describes the concept of uncertainty in the value of equivalent hue.

In addition, to be maximally differentiable, the desired colors which are represented as points on this spherical surface will be distributed thereon in a manner such that the density of points be as equal as possible over the surface. To accomplish equality of distribution, construct a differential zonal band 22 about sphere 1 centered at the latitudenal color value angle $\theta$ and of differential angular width $d\theta$. The differential width of zonal band 22 at the spherical surface will be dw, where $dw = r_s d\theta$, and the radius of the planar circle so formed will be $r_z$.

Trigonometric considerations show that $r_z = r_s \sin\theta$ and that the differential area of zonal band 22 must be $2\pi r_z dw = 2\pi r_s^2 \sin\theta d\theta$. Since $r_s$ is constant for sphere 1, equality of distribution requires that the number of colors lying in each differential zonal band must be proportional to $\sin\theta$. One embodiment of such a distribution will now be set forth.

Assume that N subranges corresponding to N colors are desired. Let each subrange be designated by a subrange definer, a, that takes on integral values from 0 to A, where $A = N - 1$. Each of the N subrange definers will be associated with a distinct color.

In order to determine the color value angle $\theta$ for each subrange, we observe from the foregoing trigonometric considerations that $(da)/(d\theta) = k \sin\theta$, where k is a constant to be determined. Integrating this expression, observing that $0 \leq a \leq A$ and $0 \leq \theta \leq \pi$ we find that:

$$\int_O^A da = k \int_O^\pi \sin\theta d\theta;$$

therefore, $A = 2k$; or, $k = A/2$
Thus, in general, the color value angle $\theta$ associated with each subrange definer, a, will be given by:

$$\int_0^a da = \frac{A}{2} \int_0^\theta \sin\theta d\theta; a = \frac{A}{2}[1 - \cos\theta]$$

which may be rewritten $$\theta = \arccos\left(1 - \frac{a a}{A}\right).$$

In order to determine the hue angle for each subrange, a spiral 28, as shown on FIG. 4, may now be constructed in a manner which satisfies the maximal differentiability requirement via equality of zonal distribution. The longitudinal hue angle $\phi$ will be related to the latitudenal color value angle, $\theta$, by the equation $\phi = 2c\theta$, where c is the color contrast parameter and is equal to the number of cycles in spiral 28 as it winds from $\theta = 0$ to $\theta = \pi$. Color contrast parameter c controls and is a direct measure of color contrast between adjacent color coordinate pairs ($\theta a$, $\phi a$) associated with the definers, a. These maximally differentiable colors are indicated schematically by crosses 29 on spiral 28. It will be seen that adjacent or nearly adjacent subranges differ substantially in equivalent hue, while widely different subranges differ substantially in equivalent value. Thus the color differences associated with different subranges are clearly discernible for small as well as large differences in the value of subrange definer.

The method is now extended to the case where a human, photoelectric, or other type of interpreter cannot perceive all of the equivalent hues of the color sphere with equal ability. In humans, those manifesting slightly imbalanced hue perceptive ability are known as protanomalous, deuteranomalous, or tritanomalous observers, while those manifesting total inability to perceive certain hues are known as protanopes, deuteranopes, or tritanopes. Additionally, those who can perceive no hues, but only shades of gray, are known as rod monochromats. For photoelectric or other non-human types of interpreting devices, the detection mechanism may have an output response which varies significantly depending upon the hue available to the input sensor.

The extension of the method to these cases involves a coordinate transformation from $\phi'$ to $\phi$, where $\phi'$, the perceived hue, will now be defined $\phi' = 2c\theta$ and $\phi'$ will be converted into a color sphere coordinate, $\phi$, in the following way. For every equivalent hue, defined by an angle $\phi_H$ on the color sphere as shown in FIG. 5, assign a perception weighting value, $w(\phi_H)$, indicative of the relative ability of the human or electronic interpreter to perceive that equivalent hue. For example, the perception weighting function may simply be the inverse uncertainty of the hue angle: if all the equivalent hues lying about $\phi_H$ with the range $\Delta\phi_H$ are indistinguishable to the interpreter, then an uncertainty of $\Delta\phi_H$ with respect to $\phi_H$ is said to exist for the interpreter; the perception weighting function would be defined then as $w(\phi_H) = 1/(\Delta\phi_H)$. As another example, the perception weighting function $w(\phi_H)$ may simply by the value of the measured response $R(\phi_H)$ at the output of a measuring device when an input of standardized intensity of the given equivalent hue $\phi_H$ is provided. As a third example, if the interpreter cannot perceive hues between $\phi = 0$ and $\phi = 2\pi/3$, but perceives equally well all hues between $\phi = 2\pi/3$ and $\phi = 2\pi$, then $w(\phi_H) = 0$ for $0 < \phi_H < 2\pi/3$ and $w(\phi_H) = 1$ for $2\pi/3 \leq \phi_H \leq 2\pi$.

In all of these examples, the transformation between $\phi'$ and $\phi$ is specified by:

$$\phi'(\phi) = \frac{2\pi \int_O^\phi w(\phi_H)d\phi_H}{\int_O^{2\pi} w(\phi_H)d\phi_H}$$

For a given $\phi'$, the value of $\phi$ is ascertained as that for which $$\int_O^\phi w(\phi_H)d\phi_H = \frac{\phi'}{2\pi} \int_O^{2\pi} w(\phi_H)d\phi_H$$

Figure 6A:
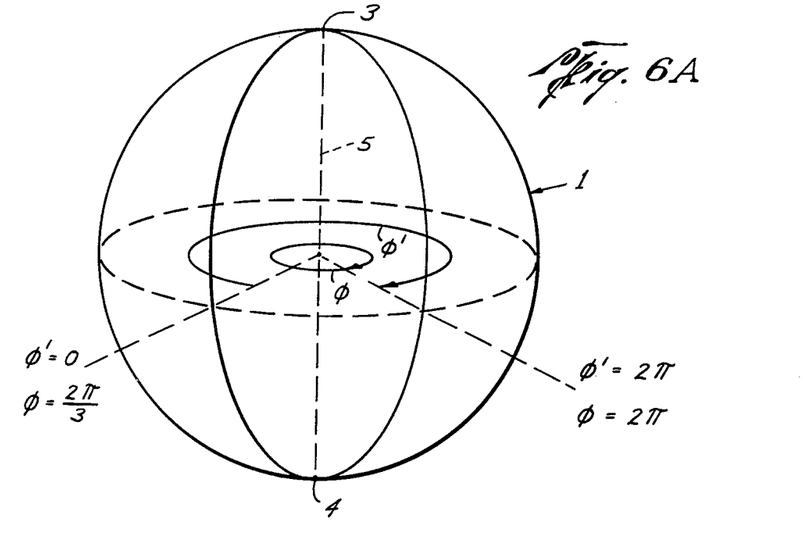
FIG. 6A is a schematic drawing that shows a relationship between perceived hue, $\phi'$, and equivalent hue, $\phi$, referenced to the color sphere.
Figures 6B, 6C:
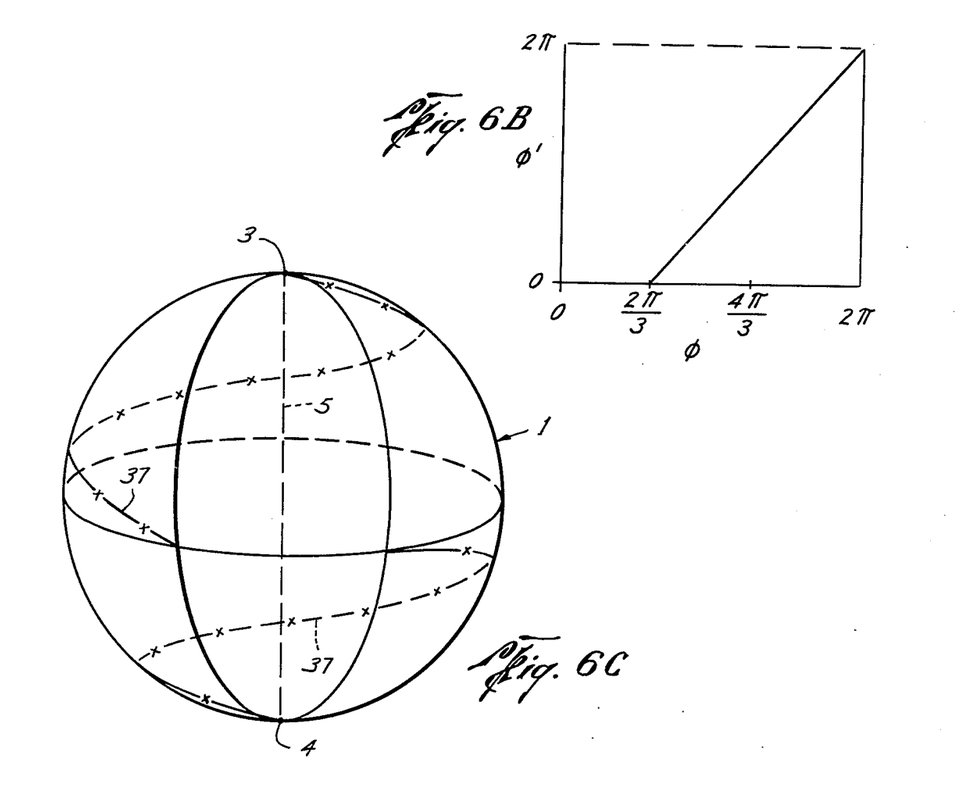
FIG. 6B shows a graphical relationship between $\phi'$, and $\phi$.
FIG. 6C is a schematic showing the color spiral of FIG. 4 modified to account for a specific difference between perceived hue and equivalent hue.

Thus for the third example above, as the perceived hue, $\phi'$ in FIG. 6A, spans the angles from $\phi' = 0$ to $\phi' = 2\pi$, this is equivalent to $\phi$ spanning the equivalent hues from $\phi = 2\pi/3$ to $\phi = 2\pi$. FIG. 6B shows the graphical relationship between $\phi'$ and $\phi$. As $$\phi' = 2c\theta = 2c\arccos\left(1 - \frac{2a}{A}\right)$$

changes as a function of the subrange definer, a, the corresponding equivalent hue angle, $\phi$, takes on all values except those in the range $0 < \phi < 2\pi/3$. The spiral 28 of FIG. 4 would thus be modified to correspond to the transformed spiral 37 of FIG. 6C.

Differential perception of the colors assigned to subranges will be enhanced by transformation of the coordinate system of the color sphere through the use of a general weighting function derived from the perception characteristics of the interpreter. The use of confusing or ill-defined colors is minimized.

The method includes provision for translating the colors defined by positions of the color sphere into variable density (or transmittance) negatives or positives for color compositing by conventional photochemical, mechanical, or other means, or into varying illumination levels of colored light-emitting devices. Each color previously defined by the above methods will be representable by the color location coordinates r, $\theta$ and $\phi$ which are reproduced in FIG. 7.

Figure 7:
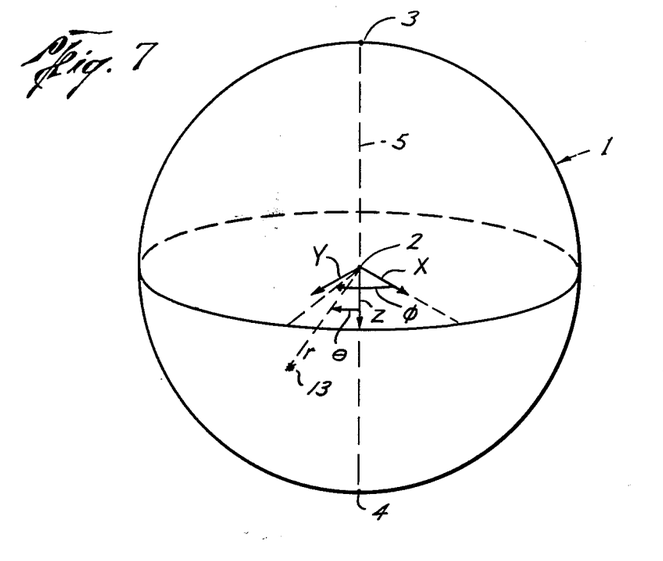
FIG. 7 is a schematic that shows the Cartesian coordinate system X, Y, Z, in which the location of any point $r$, $\theta$, $\phi$ may be expressed.

Define Cartesian axes, x, y and z as shown. The coordinates in this system will be given as a function of those in the previous system by $x = r \sin \theta \cos \theta = r_s \hat{x}$; $y = r \sin \theta \sin \phi = r_s \hat{y}$; $z = r \cos \theta = r_s \hat{z}$. The origin 2 of this system is of course unchanged.

Figure 8:
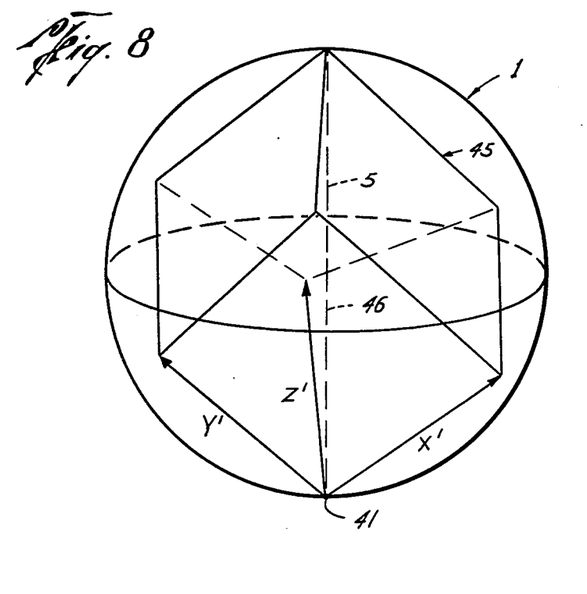
FIG. 8 is a schematic that depicts the transformed Cartesian system X', Y', Z', which measures directly densities or transmittances for component masks for color reproduction, or the illumination level of colored light emitting devices.

Now to effect direct measurement of density, (or transmittance or illumination level), apply the following set of transformations. First normalize the above coordinates by dividing by $r_s$, the radius of the sphere. Then $\hat{x} = x/r_s$, $\hat{y} = y/r_s$, and $\hat{z} = z/r_s$ must lie between $+1$ and $-1$. Next displace the origin by $+1$ unit in Z as indicated 41 in FIG. 8, and by scaling, (optionally) reflecting, and rotating axes define a new orthonormal coordinate system with axes x', y' and z' which form the basis triad for an inscribed cube 45 of color sphere 1. The major diagonal 46 of inscribed cube 45 is coincident with gray axis 5. The example of a scaled, reflected, and rotated axis system shown in FIG. 8 is obtained by the transformation $$X' = \left(\frac{\sqrt{2}}{2}\right)\hat{x} - \frac{1}{2}(\hat{z} - 1)$$

$$Y' = \left(-\frac{\sqrt{2}}{4}\right)\hat{x} - \left(\frac{\sqrt{6}}{4}\right)\hat{y} - \frac{1}{2}(\hat{z} - 1)$$

$$Z' = \left(-\frac{\sqrt{2}}{4}\right)\hat{x} + \left(\frac{\sqrt{6}}{4}\right)\hat{y} - \frac{1}{2}(\hat{z} - 1)$$

Additionally, if individually x', y' or z' lie outside the range from 0 to $+1$, then they are set equal to the closest end point of this range. The values of x', y' and z' correspond to the variable densities (or transmittances or illumination levels) of the negatives (or positives) of each primary subtractive (or additive) hue, with 0 corresponding to minimum density (or transmittance or illumination level) and $+1$ corresponding to maximum density (or transmittance or illumination level).

Thus the color of a subrange, for example, specified by the color sphere values $r_s$, $\theta$ and $\phi$, is transformed to the equivalent values x, y, and z and finally to the values x', y' and z'. These latter values are translated directly on a one-to-one basis but not necessarily with linear proportionality, into density (or transmittivity or illuminance level) values to be used with photographic, electronic, or other reproduction schemes to produce a composite, full-or partially-colored display. The colors thus produced are associated with the values of the corresponding subranges by means of an appropriate translation scale.

Figure 9:
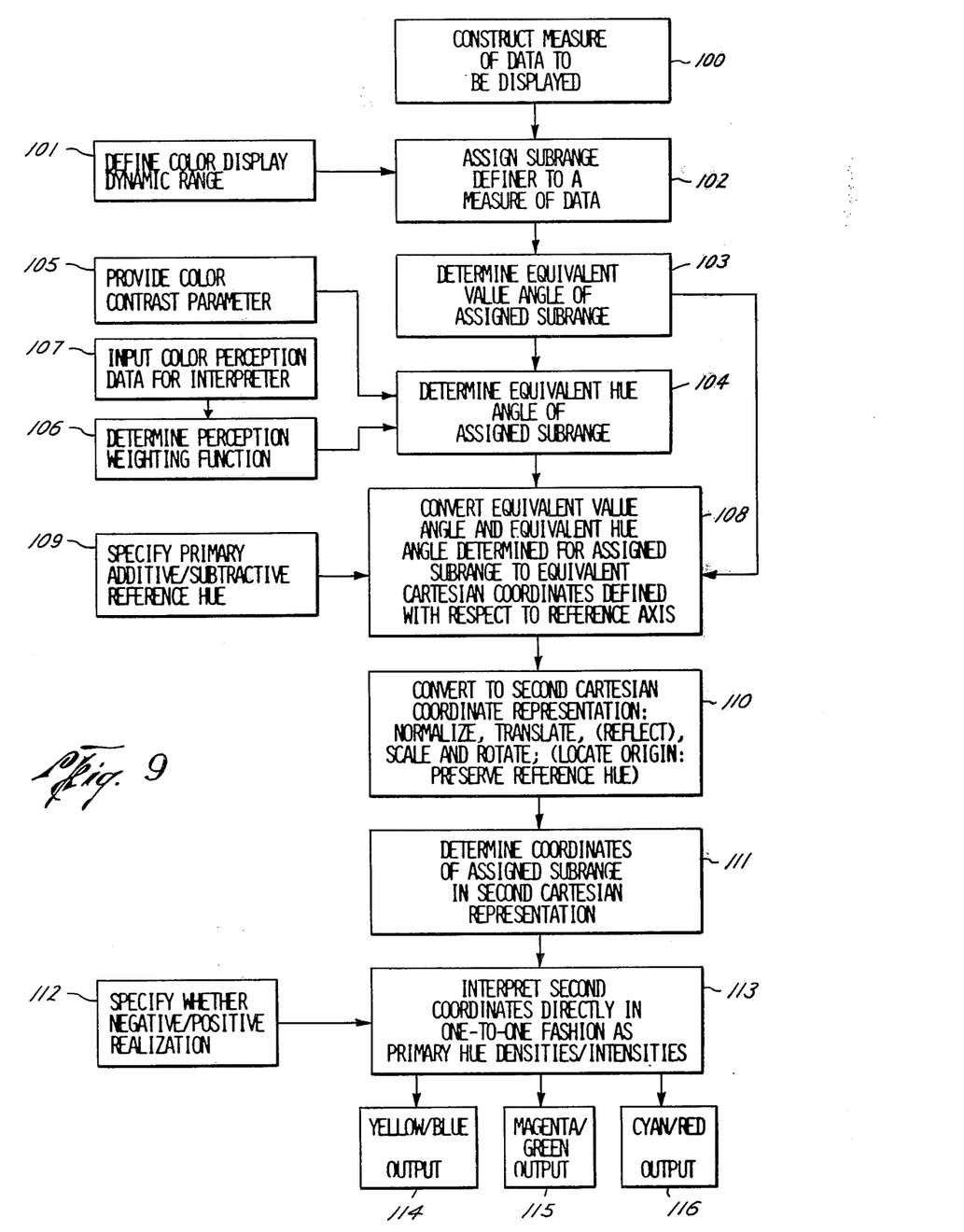
FIG. 9 is a flow chart representation of a method of practicing the present invention.

Referring now to FIG. 9, a plan for instructing a digital computer to perform the preferred embodiment of the invention is set out. At Step 100, prior to actual processing of the data, a measure of the data is constructed. In the case of a digital computer, the measure is constructed by sampling the data at incremental points in the domain of the independent variable. It will of course be recognized by those skilled in the art that the data could be processed in continuous fashion by suitably constructed analog computer.

Prior to processing, the color display dynamic range is defined, and that range is put into the computer, at Step 101. A measure of the data is put into the computer and, at Step 102, is associated with a subrange definer corresponding to a particular subrange of the color display dynamic range. At Step 103, an equivalent value angle of the assigned subrange is determined according to the method of the present invention. At Step 104, the equivalent hue angle of the assigned subrange is determined with respect to a preselected color contrast parameter 105 and a perception weighting function 106 determined from the color perception data for the interpreter 107. It will be recalled that the color contrast parameter controls and is a direct measure of the hue contrast between adjacent color coordinate pairs. The perception weighting function, input at Step 106, is determined from the color perception data for the interpreter, input at Step 107, and allows interpreters having color perceptual deficiencies to distinquish equally well all colors assigned to the various subranges. In the case of normally sighted interpreters, the perception weighting function is equal for all longitudenal equivalent hue angles.

The equivalent value angle and equivalent hue angle determined for the subrange are converted to a set of equivalent Cartesian coordinates at Step 108. The equivalent Cartesian coordinates are defined with respect to a reference axis, which is specified by input 109. Input 109 is specified according to whether an additive or subtractive realization of the display is desired. The equivalent Cartesian coordinates obtained at Step 108 are converted to a second Cartesian coordinate representation at Step 110, wherein the axes of the first equivalent Cartesian coordinates are normalized, translated, optionally reflected, scaled and rotated, such that the origin of the second Cartesian coordinate system is located at the reference pole of the color sphere and the reference hue is preserved. Then at Step 111, the coordinates of the assigned subrange are determined in the second Cartesian system formed in Step 110. After specifying at Step 112 whether a negative or positive realization is desired, the coordinates generated in Step 111 are interpreted directly in one-to-one fashion as primary hue densities or intensities at Step 113, which are output as yellow/blue 114, magenta/green 115, and cyan/red 116.

Each measure of the data is sequentially processed in the manner set forth in FIG. 9 throughout the entire domain of the independent variable and the primary components corresponding to the entire domain are contained in outputs 114, 115 and 116. The primary color outputs may then be processed in any of several conventional photographic methods to form a final display.

Figure 10:
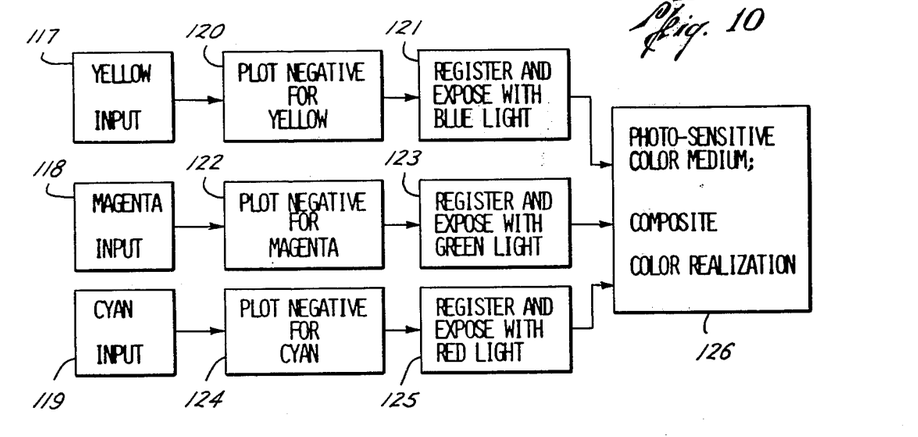
FIG. 10 is a schematic of the separation negative (photographic) embodiment of the present invention.

One method for forming the final color display is set forth in FIG. 10, which presents a subtractive, separation negative (photographic) embodiment of the present invention. The primary subtractive hues obtained from the method as set forth in FIG. 9, wherein a subtractive primary hue is specified at Step 109 and a negative realization is specified at Step 112, are processed as follows.

The primary color outputs 114, 115 and 116, in FIG. 9 become primary color inputs 117, 118 and 119 in FIG. 10. Yellow input 117 is processed to plot a negative for yellow at Step 120, which in turn is exposed with blue light at Step 121. In similar fashion magenta input is processed to plot a negative for magenta at Step 122, which is exposed to green light at Step 123. Finally, cyan input 119 is processed to plot a negative for cyan at Step 124, which is exposed with red light at Step 125. The component exposures obtained in Steps 121, 123 and 125 were registered to form composite color realization 126.

Figure 11:
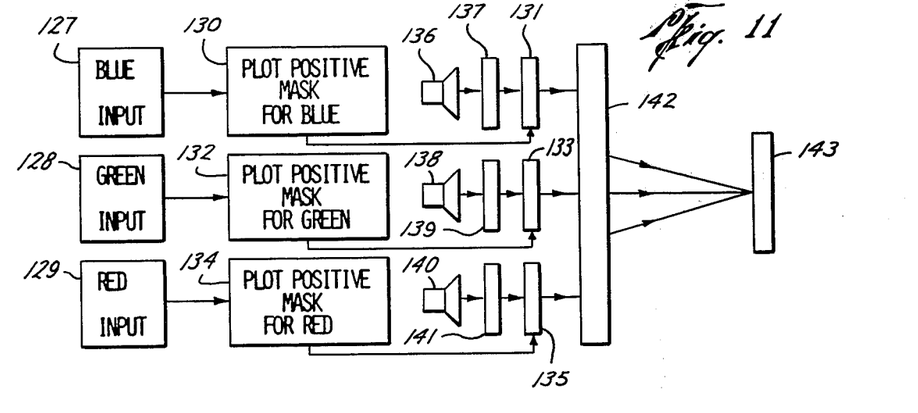
FIG. 11 is a schematic showing the separation positive (projection or photographic) embodiment of the present invention.
Figure 12:
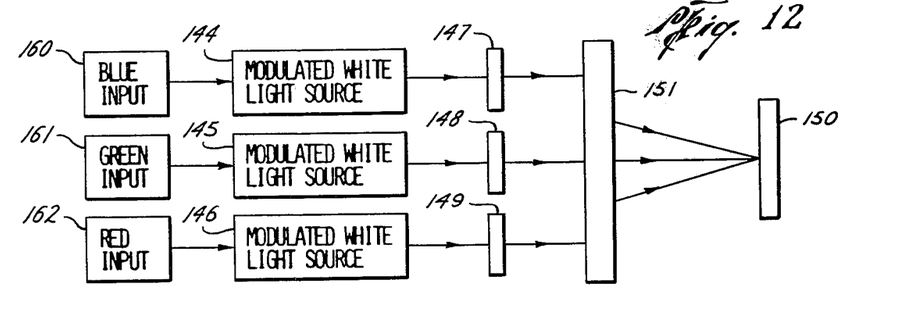
FIG. 12 is a schematic showing the modulated light intensity embodiment of the present invention.

FIGS. 11 and 12 illustrate methods of producing an additive, positive realization of the color display formed by the method of the present invention. Primary, additive outputs are produced according to the method as set forth in FIG. 9 by specifying an additive reference hue at Step 109 and a positive realization at Step 112. Blue input 127, corresponds to blue output 114, green input 128 corresponds to green output 115, and red input 129 corresponds to red output 116. Blue input 127 is processed at Step 130 to form mask 131, green input 128 is processed at Step 132 to form mask 133, and red input 129 is processed at Step 134 to form mask 135. Mask 131 is illuminated by a constant intensity light source 136, the light from which passes through a blue filter 137. Mask 133 is illuminated by a constant intensity light source 138, the light from which passes through a green filter 139. Mask 135 is illuminated by a constant intensity light source 140, the light from which passes through red filter 141. The light passing through masks 131, 133 and 135 is aligned and focused by alignment and focusing means 142, which includes a combination of mirrors and lenses, upon an imaging device 143 to form a composite display. Imaging device 143 may be a projection screen or a photographic material.

FIG. 12 illustrates an alternative method of producing a final composite color display from blue input 160, green input 161 and red input 162. Blue input 162 operates an modulated light source 144 to produce variable intensity white light. Similarly, green input 161 and red input 162 operate modulated light sources 145 and 146, respectively. The light from modulated light source 144 passes through blue filter 147, the light from modulated light light source 145 passes through green filter 148, and the light from modulated light source 146 passes through red filter 149 and the colored light from those sources is aligned and focused on imaging device 150 by means of alignment and focusing device 151 to form the final color display.

Further modifications and alternative embodiments of the method of this invention will be apparent to those skilled in the art in view of this description. Accordingly, this description is to be construed as illustrative only and is for the purpose of teaching those skilled in the art the manner of carrying out the invention. For example, equivalent steps may be substituted for those illustrated and described herein and other conventional methods of producing color realizations may be substituted for those set forth, all as would be apparent to one skilled in the art after having the benefit of this description of the invention.

What is claimed is:

1. A method for displaying in color, in a manner which shall be maximally differentiable to an interpreter, any measure of a physical quantity which is itself a function of a physical quantity, whether continuous or discretely sampled, which comprises the following steps:

defining a color display dynamic range, which includes a plurality of subranges;

associating said measure of said physical quantity with a subrange;

associating said subrange with a point of a color sphere, wherein each point of said color sphere is defined by a radial distance, a latitudenal equivalent value angle and a longitudenal equivalent hue angle, such that the distribution density of said latitudenal equivalent value angles of said points is substantially proportional to the sine of said latitudenal equivalent value angle and said longitudenal equivalent hue angle is determined by a preselected color contrast parameter that relates the latitudenal equivalent value angle and longitudenal equivalent hue angle associated with said point, and wherein the distribution density of said longitudenal equivalent hue angles is substantially proportional to a weighting function determined by the ability of an interpreter to identify unambiguously the hue corresponding to each of said longitudenal equivalent hue angles;

converting the spherical coordinate representation of said point into an equivalent first Cartesian coordinate representation with a longitudenal reference axis chosen to correspond to a primary reference hue angle;

creating a second Cartesian coordinate system by scaling, translating, and rotating the axes of said first Cartesian coordinate system so that the origin thereby created corresponds to a pole of the color sphere and the axes thereby created make equal angles with the polar axis of said color sphere, with the longitudenal direction of said reference axis preserved after transformation;

converting said first Cartesian coordinate representation of said point into a representation in said second Cartesian coordinate system;

interpreting the coordinates of said point in said second coordinate system directly in the manner of a one-to-one transformation as the amounts of each of the primary hues necessary to produce the color associated with said subrange and said measure associated therewith;

and compositing the amounts of said primary hues corresponding to said measure into a final display.

2. The method as claimed in claim 1, wherein said creating step additionally includes reflecting an axis of said first Cartesian axes.

3. The method as claimed in claim 1, wherein said radial distance associated with every point is equal to the radius of said color sphere.

4. The method as claimed in claim 1, wherein said weighting function is equal for all longitudenal equivalent hue angles.

5. The method as claimed in claim 1, wherein said weighting function is specifically inversely related to the relative uncertainty in perceiving each color as represented by each longitudenal equivalent hue angle.

6. The method as claimed in claim 1, wherein said weighting function is specifically directly related to the relative amplitude of a measured response at the output of a measuring device when an input of standardized intensity is provided for each longitudenal equivalent hue angle.

7. The method as claimed in claim 1, wherein said weighting function is specifically zero over a portion of the range of longitudenal equivalent hue angles.

8. The method as claimed in claim 1, including the further step of:
forming a schematic and systematic representation of the colors associated with each of said measures, whereby the interpreter may correlate said colors with said measures.

9. The color method as claimed in claim 1, wherein:
said interpreting step includes associating said second Cartesian coordinates of said point with corresponding densities in masks which control the amount and location of subtractive primary hue dyes on a substrate;
and said compositioning step includes registering and producing said primary hues on an integral substrate.

10. The color method as claimed in claim 1, wherein:
said interpreting step includes associating said second Cartesian coordinate respresentation of said point with corresponding transmittances masks for constant intensity light sources directed to an imaging device;
and said compositing step includes aligning the images formed on said imaging device.

11. The color method as claimed in claim 1, wherein:
said interpreting step includes modulating variable intensity light sources associated with each additive primary hue to form an image on an imaging device;
and said compositing step includes aligning said images formed on said imaging device.

* * * * *